United States Patent [19]
Kobayashi

[11] Patent Number: 4,705,569

[45] Date of Patent: Nov. 10, 1987

[54] HYDRAULIC MATERIAL COMPOSITION

[75] Inventor: Waichi Kobayashi, Ube, Japan

[73] Assignee: Ube Industries, Ltd., Yamaguchi, Japan

[21] Appl. No.: 858,176

[22] Filed: May 1, 1986

[30] Foreign Application Priority Data

May 2, 1985 [JP] Japan .................................. 60-95768

[51] Int. Cl.$^4$ ................................................ C04B 7/00
[52] U.S. Cl. ........................................ 106/85; 106/89; 106/97; 106/314
[58] Field of Search ....................... 106/97, 85, 314, 89

[56] References Cited

U.S. PATENT DOCUMENTS 2,836,502  5/1958  Bartoli et al. ........................ 106/314
4,424,074  1/1984  Villa et al. ........................... 106/314

FOREIGN PATENT DOCUMENTS 897733  2/1982  U.S.S.R. ............................. 106/314

*Primary Examiner*—William R. Dixon, Jr.
*Assistant Examiner*—Steven Capella
*Attorney, Agent, or Firm*—Wenderoth, Lind & Ponack

[57] ABSTRACT

A hydraulic material composition comprising cement and 0.01 to 2.0% by weight, as zinc oxide based on the cement, of a zinc-containing compound, such as zinc oxide having an average particle diameter of at least 20 micrometers. It does not corrode a steel material even when molded with the use of sand or sea water containing steel-corroding components such as chlorides.

11 Claims, No Drawings

HYDRAULIC MATERIAL COMPOSITION

This invention relates to a hydraulic material composition having a novel chemical composition. More specifically, it relates to a hydraulic material composition which does not corrode a steel material even when molded with the use of sand or sea water containing steel-corroding components such as chlorides.

Steel materials such as an iron reinforcement used as a reinforcing material for hardened cement are usually protected from corrosion by a passive-state film formed on their surface because the hardened cement is strongly alkaline. If, however, corroding substances such as chlorides are present in the hardened cement, the action of a chlorine ion, etc. destroys the passive-state film on the surface of the steel material and corrosion of the steel material proceeds.

When river sand is used as fine aggregate for conrete, the inclusion of a corroding substance such as a chlorine compound in the hardened cement is rare, and no measure is required for inhibiting corrosion of the steel material in the hardened cement. Nowadays, however, there is a shortage of river sand having good quality, and frequently, sea sand is substituted for it. The use of sea sand inevitably results in the inclusion of a chloride in hardened cement. The chloride corrodes steel in the hardened cement, and eventually shortens the life of concrete structures.

The corrosion of steel materials by corrosive substances such as chlorides included in hardened cement as a result of using sea sand has thus constituted a serious problem.

A steel material embedded in hardened cement placed in a corrosive environment, particularly in an environment in which it makes contact with sea water and is repeatedly wetted and dried, is gradually corroded by corrosive components which come into the hardened cement.

Washing of sea sand with water is one known method of preventing such corrosion of steel by the chloride in hardened cement. A very large quantity of water, however, is required in order to reduce the chlorine ion concentration in sea sand by washing. Hence, the cost of producing fine aggregate becomes high. Moreover, minute particles of the sea sand flow out, and fine aggregate of good quality cannot be obtained.

Another known method of preventing corrosion of steel in hardened cement as a result of contact with a corrosive component such as a chlorine ion in sea water is to thicken the concrete layer or to finish the surface layer of concrete with tiles, paints having resinous vehicles, etc. This method is effective against the intrusion of chlorides, etc. from outside, but is ineffective when corrosive substances exist in hardened cement from the outset, for example when a corrosive cement admixture such as calcium chloride is used.

It is also known to inhibit corrosion of steel in hardened cement by (a) using a steel material whose surface is zinc-plated, or (b) using a steel material coated with a synthetic resin or the like. The method (a) is costly. Furthermore, when the steel material is welded at the site of job, the welded part cannot be plated. When the welded part is not treated well, corrosion occurs at this part and becomes heavier than on a non-plated steel material. The method (b) is costly, and the adhesion of the coated steel material to hardened cement is not satisfactory.

From another aspect, a method of controlling corrosion of a steel material was previously proposed which comprises adding a nitrite salt to hardened cement. The corrosion of steel in the hardened cement can be controlled to some extent by this method, but its effect is not sufficient. Particularly, if the amount of the nitrite is insufficient, local corrosion (so-called pitting) is likely to occur.

Accordingly, none of the prior art methods have proved to be entirely satisfactory in respect of anti-corrosion and cost considered comprehensively.

Japanese Laid-Open Patent Publication No. 68837/1979 discloses an anticorrosive paint comprising an aqueous polymer, cement and at least one compound selected from oxides, hydroxides and sulfates of zinc, copper and lead. This paint is characterized by the inclusion of the aforesaid metal compound into a known anticorrosive paint comprising a mixture of an aqueous polymer and cement. The patent document states that this paint can give a coated film having excellent adhesion to a substrate without peeling and good cracking resistance. The paint described in this patent document contains the aqueous polymer. The patent document is quite silent on the particle diameter of the metal compound to be added to the paint. However, since the metal compound is added to the paint, it is evidently in the form of very fine particles.

It is an object of this invention to provide a hydraulic material composition having a novel chemical composition.

Another object of this invention is to provide a hydraulic material composition capable of giving hardened cement which does not corrode a steel material even when molded with the use of sea water of sand containing corrosive components such as chlorides, or when contacted with sea water and repeatedly wetted and dried.

Still another object of this invention is to provide a hydraulic material composition which is not corrosive on a steel material and has much the same setting time in cement hydration as ordinary cement.

Yet another object of this invention is to provide a hydraulic material composition which does not corrode a steel material nor retard the manifestation of the strength of hardened cement.

Further objects of this invention along with its advantages will become apparent from the following description.

According to this invention, these objects and advantages are achieved by a hydraulic material composition comprising cement and 0.01 to 2.0% by weight, as zinc oxide based on the cement, of a zinc-containing compound.

The hydraulic material composition of this invention is not a paint, and does not contain a film-forming amount of an aqueous polymer.

Various zinc-containing compounds can be used in the present invention. Examples include zinc oxide, zinc hydroxide, zinc sulfate, by-products of zinc refining, zinc-containing minerals, zinc silicate, and metallic zinc. Of these, zinc oxide, zinc hydroxide and zinc sulfate are preferred. These compounds may be used singly or in combination.

The amount of the zinc-containing compound is 0.01 to 2.0% by weight, preferably 0.01 to 0.6% by weight, especially preferably 0.05 to 0.5% by weight, calculated as zinc oxide based on the weight of cement. The zinc-containing compound has an average particle diameter of preferably at least 20 micrometers, more preferably 30 to 1,000 micrometers, especially preferably 50 to 500 micrometers.

In a preferred embodiment, the hydraulic material composition of the invention comprises cement and 0.01 to 2.0% by weight, based on the cement, of zinc oxide having an average particle diameter of at least 20 micrometers. Preferably, the amount of zinc oxide used in this preferred embodiment is 0.05 to 0.5% by weight.

The inclusion of the zinc-containing compound in the composition of this invention prevents corrosion of a steel material and can retain the basic properties required of cement, for example its hardening properties in the production of mortar, concrete or reinforced concrete by steel materials. If the content of the zinc-containing compound is less than 0.01% by weight, the corrosion of steel in hardened cement cannot be fully prevented. On the other hand, amounts exceeding 2.0% by weight based on the cement are favorable for corrosion inhibition of steel materials. But when relatively fine zinc oxide having an average particle diameter of less than about 20 microns is used, the hydration of cement which is one of the hardening properties is suppressed. The suppressed hydration tends to give rise to problems in hardening properties, such as the prolonged setting time and the retarded development of the strength of hardened cement.

Examples of the cement used in this invention include various portland cements, blast furnace cement and flyash cement.

The composition of this invention may be in the form of, for example, a powdery composition composed of cement and the zinc-containing compound such as zinc oxide, a mortar composition composed of cement, the zinc-containing compound and fine aggregate, or a concrete composition composed of cement, the zinc-containing compound, fine aggregate and coarse aggregate. It may also be in the form of a wet composition composed of any one of the aforesaid compositions and an amount of water sufficient to harden cement.

The zinc-containing compound may be dry-mixed with cement, or may be added and dry-mixed during the production of cement by crushing clinker and gypsum. The zinc-containing compound may also be added to cement as a mixture with an ordinary admixture such as a water reducing agent or an air-entraining agent. The composition of this invention may also be prepared by mixing cement containing the zinc-containing compound with an ordinary cement.

Furthermore, the zinc-containing compound may be added to concrete- or mortar-production materials in a ready-mixed concrete plant. The time of addition may be any time during mixing.

Investigations of the present inventor have shown that zinc oxide obtained by sintering a compound such as basic zinc carbonate or zinc oxalate at a temperature of at least 800° C., and zinc oxide obtained by sintering zinc oxide, especially its fine particles having an average particle diameter of less than 20 microns have very superior anticorrosive effect and do not degrade the hardening properties of the hydraulic material composition. Sintering may be carried out by methods known per se, preferably in an electric furnace, a rotary kiln, etc. Sintering may be effected in the co-presence of copper oxide or lead oxide. The presence of copper or lead oxide not only promotes firing of zinc oxide having an average particle diameter of at least 20 micrometers but also acts advantageously on the inhibition of corrosion of steel materials.

Conventional fine aggregates, coarse aggregates and additives may be used in the production of mortar or concrete using the composition of this invention. According to this invention, sea sand from which salts are not removed, and aggregates containing chlorides may also be used. Sea water may also be used as water to be used in mixing. In other words, so long as the composition of this invention is used, the corrosion of a steel material in hardened cement can be prevented even when sea sand having an ordinary chloride content or sea water as water for kneading is used.

The details of the mechanism of corrosion inhibition in hardened cement made from the mortar or concrete in accordance with this invention have not been elucidated. However, it is presumably because in hardened cement at least containing the zinc-containing substance, the natural electrode potential of the steel material changes to a "nobler" side than $-200$ to $-300$ mV which is the corrosion potential limit of iron. It has been confirmed that a dense texture forms in the boundary surface between the steel material and the hardened cement.

The following examples illustrate the present invention in more detail.

EXAMPLES 1-5, COMPARATIVE EXAMPLE 1-2 AND REFERENTIAL EXAMPLE 1

In each run, mortar was produced by kneading commercial ordinary portland cement, Toyoura standard sand, water for mixing and zinc oxide powder (1st grade reagent; average particle diameter 1.5 micrometers) in each of the amounts indicated in Table 1. The weight ratio of the portland cement to the sand was 1:3, and the water-cement ratio was adjusted to 0.8.

An iron plate having a size of $20 \times 20 \times 1$ mm of which surface had been polished and degreased was put in a plywood mold having a size of $40 \times 40 \times 10$ mm. The mortar was filled in the mold, and cured for 2 days at 20° C. in humid atmosphere having a humidity of 90%. The mold was then removed to obtain a sample.

The state of hardening of the surface of the sample was observed visually, and then aged in saturated steam at 65° C. for 7, 14, 28, 56, and 91 days, respectively. The sample was then broken by using a compression tester, and the iron plate was taken out. The ratio of the area of a corroded portion in the iron plate was measured. The results are shown in Table 2.

The chlorine ion concentration in the sea water was about 17 g/liter. When the sea water was directly used as water for mixing or when a 1:4 mixture of sea water and tap water was used as water for mixing, the chloride concentration based on sand in the mortar was about 0.15% as NaCl which is higher than the generally accepted chloride concentration of fine aggregate.

TABLE 1

| Run (*) | Mixing water | Amount of ZnO added (wt. %) |
|---|---|---|
| Ex. 1 | Sea water | 0.10 |
| Ex. 2 | Sea water | 0.20 |
| Ex. 3 | Sea water | 0.46 |
| Ex. 4 | Sea water:tap water (1:1) | 0.04 |
| Ex. 5 | Sea water:tap water (1:4) | 0.01 |
| CEx. 1 | Sea water | 0 |
| CEx. 2 | Sea water:tap water | 0 |

TABLE 1-continued

| Run (*) | Mixing water | Amount of ZnO added (wt. %) |
|---|---|---|
| Ref. 1 | (1:4) Tap water | 0 |

(*) In the above and subsequent tables, the following abbreviations are used.
Ex. = Example
CEx. = Comparative Example
Ref. = Referential Example

TABLE 2

| Run | \multicolumn{5}{c}{Portion which showed corrosion after curing for the days indicated below (%)} | Hardening property (**) |
| | 7 | 14 | 28 | 56 | 91 | |
|---|---|---|---|---|---|---|
| Ex. 1 | 0 | 0 | 0 | 0 | 0 | A |
| Ex. 2 | 0 | 0 | 0 | 0 | 0 | A |
| Ex. 3 | 0 | 0 | 0 | 0 | 0 | B |
| Ex. 4 | 0 | 0 | 0 | 0 | 0 | A |
| Ex. 5 | 0 | 0 | 0 | 0 | 0 | A |
| CEx. 1 | 0 | 0 | 10 | 70 | 80 | A |
| CEx. 2 | 0 | 0 | 0 | 10 | 20 | A |
| Ref. 1 | 0 | 0 | 0 | 0 | 0 | A |

(**): "A" means that the hardening property is without a problem, and "B" means that the hardening is nearly without a problem.

EXAMPLES 6-8, COMPARATIVE EXAMPLE 3, AND REFERENTIAL EXAMPLE 2

Ordinary portland cement, Toyoura standard sand, sea water as mixing water, and a powder of zinc oxide ore having an average particle diameter of 55 micrometers in each of the amounts indicated in Table 3 were mixed to produce mortar. The weight ratio of the cement to the sand was adjusted to 1:3, and the water-cement ratio, to 0.8.

A steel plate having a size of 20×20×1 mm of which surface had been polished and degreased was put in a plywood mold having a size of 40×40×10 mm. The mortar was filled in the mold, and cured for 2 days at 20° C. in humid atmosphere having a humidity of 90%. The mold was then removed to obtain a sample.

The state of hardening of the surface of the sample was observed visually, and then cured in saturated steam at 65° C. for 7, 14, 28, 56, and 91 days, respectively. The sample was then broken by using a compression tester, and the iron plate was taken out. The ratio of a portion which showed corrosion on the iron plate was measured. The results are shown in Table 4.

The sample was also subjected to a setting test in accordance with the method of physical testing of cement according to JIS R 5201.

TABLE 3

| Run | Amount of ZnO added (wt. %) |
|---|---|
| Ex. 6 | 0.05 |
| Ex. 7 | 0.2 |
| Ex. 8 | 2.0 |
| CEx. 3 | 3.0 |
| Ref. 2 | Not added |

TABLE 4

| Run | Portion which showed corrosion after curing for the days indicated below (%) | | | | | Setting time (hour-minute) | |
| | 7 | 14 | 28 | 56 | 91 | Initial | Final |
|---|---|---|---|---|---|---|---|
| Ex. 6 | 0 | 0 | 0 | 0 | 0 | 2-15 | 3-20 |
| Ex. 7 | 0 | 0 | 0 | 0 | 0 | 2-30 | 3-35 |
| Ex. 8 | 0 | 0 | 0 | 0 | 0 | 2-50 | 3-55 |
| CEx. 3 | 0 | 0 | 0 | 0 | 0 | 4-35 | 6-10 |
| Ref. 2 | 0 | 0 | 10 | 70 | 80 | 2-05 | 3-10 |

EXAMPLES 9-11 AND COMPARATIVE EXAMPLE 4

Example 7 was repeated except that zinc oxide powder having each of the average particle diameters indicated in Table 5 was used instead of the zinc oxide having an average particle diameter of 55 micrometers. The results are shown in Table 6.

TABLE 5

| Run | Average particle diameter of ZnO (micrometers) |
|---|---|
| Ex. 9 | 22 |
| Ex. 10 | 62 |
| Ex. 11 | 120 |
| CEx. 4 | 2 |
| Ref. 2 | Not added |

TABLE 6

| Run | Portion which showed corrosion after curing for the days indicated below (%) | | | | | Setting time (hour-minute) | |
| | 7 | 14 | 28 | 56 | 91 | Initial | Final |
|---|---|---|---|---|---|---|---|
| Ex. 9 | 0 | 0 | 0 | 0 | 0 | 2-55 | 4-00 |
| Ex. 10 | 0 | 0 | 0 | 0 | 0 | 2-35 | 3-40 |
| Ex. 11 | 0 | 0 | 0 | 0 | 0 | 2-20 | 3-25 |
| CEx. 4 | 0 | 0 | 0 | 0 | 0 | 32-30 | 36-15 |
| Ref. 2 | 0 | 0 | 10 | 70 | 80 | 2-05 | 3-10 |

EXAMPLES 12-14 AND COMPARATIVE EXAMPLES 5-6

Zinc oxide having an average particle diameter of 2 micrometers was sintered at each of the temperatures indicated in Table 7 for 0.5 hour in an electric furnace, and then pulverized to produce zinc oxide having each of the average particle diameters indicated in Table 7. Tests were conducted in the same was as in Example 7 except that the resulting zinc oxide was used instead of the zinc oxide used in Example 7. The results are shown in Table 8.

TABLE 7

| Run | Sintering temperature for ZnO (°C.) | Average particle diameter of ZnO (micrometers) |
|---|---|---|
| Ex. 12 | 800 | 26 |
| Ex. 13 | 1200 | 38 |
| Ex. 14 | 1500 | 52 |
| CEx. 5 | 400 | 6 (unsintered) |
| CEx. 6 | Not sintered | 2 |

TABLE 8

| Run | Portion which showed corrosion after curing for the days indicated below (%) | | | | | Setting time (hour-minute) | |
| | 7 | 14 | 28 | 56 | 91 | Initial | Final |
|---|---|---|---|---|---|---|---|
| Ex. 12 | 0 | 0 | 0 | 0 | 0 | 2-50 | 4-00 |
| Ex. 13 | 0 | 0 | 0 | 0 | 0 | 2-40 | 3-45 |

TABLE 8-continued

| Run | Portion which showed corrosion after curing for the days indicated below (%) | | | | | Setting time (hour-minute) | |
|---|---|---|---|---|---|---|---|
| | 7 | 14 | 28 | 56 | 91 | Initial | Final |
| Ex. 14 | 0 | 0 | 0 | 0 | 0 | 2-35 | 3-40 |
| CEx. 5 | 0 | 0 | 0 | 0 | 0 | 28-30 | 30-15 |
| CEx. 6 | 0 | 0 | 0 | 0 | 0 | 32-30 | 36-15 |

EXAMPLES 15-16 AND COMPARATIVE EXAMPLES 7-8

Commercial water reducing agent A (ligninsulfonic acid type) or commercial water reducing agent B (alkylarylsulfonic acid type) was further added to the composition of Example 13 in the proportions indicated in Table 9, and the water-cement ratio was adjusted to 0.60. The same tests as in Example 13 were carried out, and the results are shown in Table 10.

TABLE 9

| Ex. 15 | A (0.3%) + ZnO (0.2%) |
| Ex. 16 | B (0.5%) + ZnO (0.2%) |
| CEx. 7 | A (0.3%) |
| CEx. 8 | B (0.5%) |

TABLE 10

| Run | Portion which showed corrosion after curing for the days indicated below (%) | | | | | Setting time (hour-minute) | |
|---|---|---|---|---|---|---|---|
| | 7 | 14 | 28 | 56 | 91 | Initial | Final |
| Ex. 15 | 0 | 0 | 0 | 0 | 0 | 2-55 | 3-500 |
| Ex. 16 | 0 | 0 | 0 | ·0 | 0 | 2-45 | 3-455 |
| CEx. 7 | 0 | 0 | 20 | 35 | 70 | 2-30 | 3-155 |
| CEx. 8 | 0 | 0 | 5 | 20 | 35 | 2-25 | 3-100 |

As demonstrated by the foregoing examples, the use of the hydraulic material composition of this invention can inhibit corrosion of a steel material in hardened cement in a corrosive environment. Specifically, even when sea sand from which no salt is removed is used as fine aggregate, or when sea water is used as water for mixing, the corrosion of a steel material in hardened cement can be prevented. Thus, the use of the hydraulic material composition of this invention can permit construction of a reinforced concrete structure in the same way as in the case of using ordinary fine aggregate containing no chloride, or ordinary water for mixing.

The present invention can also effectively prevent the corrosion of a steel material in a structure which is susceptible to intrusion of chlorides from outside, as in a marine concrete structure.

Furthermore, the present invention makes it possible to use chloride-containing admixtures in reinforced concrete, and can inhibit the corrosion of steel materials at lower cost than can conventional steel corrosion inhibiting techniques.

Zinc-containing compounds, particularly zinc oxide, having an average particle diameter of at least 20 micrometers do not exert adverse effects, such as retarding of setting and hardening of cement, in the formation of hardened cement.

What is claimed is:

1. A hydraulic material composition comprising cement and 0.01 to 2.0% by weight, as zinc oxide based on the cement, of a zinc-containing compound, wherein the zinc-containing compound is in the form of particles having an average particle diameter of at least 20 micrometers.

2. The composition of claim 1 wherein the amount of the zinc-containing compound is 0.01 to 0.6% by weight calculated as zinc oxide based on the cement.

3. The composition of claim 1 wherein the zinc-containing compound is selected from the group consisting of zinc oxide, zinc hydroxide and zinc sulfate.

4. The composition of claim 1 which further comprises fine aggregate.

5. The composition of claim 1 which further comprises fine aggregate and coarse aggregate.

6. The composition of claim 1 which further comprises water in an amount sufficient to harden the cement.

7. A hydraulic material composition comprising cement and 0.01 to 2.0% by weight, based on the cement, of zinc oxide having an average particle diameter of at least 20 micrometers.

8. The composition of claim 7 which further comprises fine aggregate.

9. The composition of claim 7 which further comprises fine aggregate and coarse aggregate.

10. The composition of claim 8 which further comprises water in an amount sufficient to harden the cement.

11. The composition of claim 7 wherein the zinc oxide is produced by sintering zinc oxide having an average particle diameter of not more than 20 micrometers at a temperature of at least 800° C.

* * * * *